United States Patent

[11] 3,566,034

[72] Inventor Frans Brouwer
Glencoe, Ill.
[21] Appl. No. 663,026
[22] Filed Aug. 24, 1967
[45] Patented Feb. 23, 1971
[73] Assignee Stewart-Warner Corporation
Chicago, Ill.

[54] PHASING AND SYNCRONIZING CIRCUIT MEANS FOR USE IN FACSIMILE SYSTEMS OR THE LIKE
18 Claims, 4 Drawing Figs.

[52] U.S. Cl. .......... 178/69.5
[51] Int. Cl. .......... H04n 1/36
[50] Field of Search .......... 178/69.5 (E), 69.5 (F,G), 7.1

[56] References Cited

UNITED STATES PATENTS 3,423,524 1/1969 Bradford .......... 178/69.5F
3,419,680 12/1968 Brouwer et al. .......... 178/69.5F
3,385,928 5/1968 Rosenheck .......... 178/69.5F
2,722,564 11/1955 McFarlane .......... 178/69.5F
2,512,647 6/1950 Hester .......... 178/69.5F

*Primary Examiner*—Richard Murray
*Assistant Examiner*—George G. Stellar
*Attorneys*—Augustus G. Douvas, William J. Newman and Norton Lesser

ABSTRACT: Synchronizing systems of the type useful with facsimile equipment in which a motor driven recorder is driven at a speed to provide generated pulses of a quiescent frequency slightly different from the frequency of synchronizing pulses received from a transmission source and in which the speed of the motor is caused to sweep through the speed that produces a generated pulse frequency equal to the synchronizing frequency if and when there is time coincidence between the synchronizing and generated pulses. Also disclosed are photocell means for providing synchronizing pulses and generated pulses especially useful in facsimile transceivers.

Figure 1:
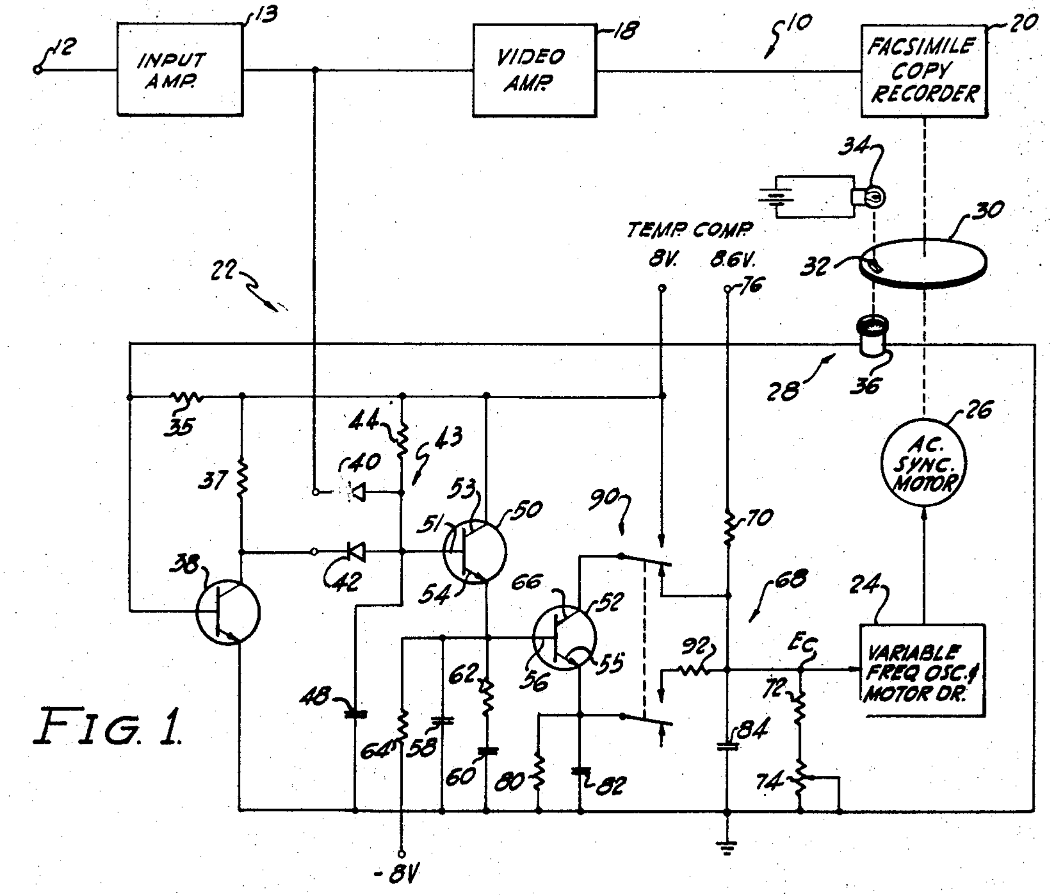

INVENTOR
Frans Brouwer.

By William J. Herman
Attorney

INVENTOR
Frans Brouwer.

By William J. Newman
Attorney

INVENTOR
Frans Brouwer.

By William J. Herman
Attorney

PHASING AND SYNCRONIZING CIRCUIT MEANS FOR USE IN FACSIMILE SYSTEMS OR THE LIKE

BACKGROUND OF THE INVENTION

Although synchronizing systems of the type disclosed herein may be useful in many different types of control systems, the invention herein will be described with respect to facsimile systems because of their particular adaptability thereto. Facsimile systems are used primarily for relaying duplicate copy representations of documents between remote locations. Generally, a facsimile system comprises a transmitter in which an electromechanical means scans a document in a line by line manner to produce a signal which varies in accordance with the light intensity of the segment of the document being scanned. A receiver at the remote location applies the varying signals to an electromechanical scanning transducer to cause the marking of a recording medium in accordance with the received electrical signals so as to reproduce a replica on the recording medium of the document being scanned at the transmitter.

The scanning means in the transmitter and the receiver must of course be synchronized with one another so that the copy formed at the receiver is essentially a reproduction of the document scanned at the transmitter. The two scanning means must scan at exactly the same frequency and in the proper phase relationship so that the beginning of each line marked at the receiver is the beginning of the corresponding line scanned at the transmitter.

This is no great problem when the facsimile transmitter and the facsimile receiver are operating off of the same commercial power network as two synchronous motors may be utilized which operate in synchronism in accordance with the characteristics of the power network. A problem arises, however, when the facsimile receiver is located a great distance from the facsimile transmitter so that they are served by different power networks. Even though power networks throughout the country are governed by national standards, there may be slight deviations in frequency and/or phases between different area network electric currents which can cause serious distortions in facsimile transmission.

One of the most widely used synchronizing arrangements in facsimile systems includes the use of a reference signal generator in the transmitter with means in the receiver operable responsive to receipt of the reference signal for amplifying same to drive synchronous motors in the receiver. In these systems the reference power signal is generally sent over a different conductor than that which the data signals are transmitted. An example of this type of synchronizing system may be seen in the U.S. Pat. application No. 458,092, filed by Robert M. Bishop on May 24, 1965 now U.S. Pat. No. 3,403,222.

Other attempts have been made to use the video signal channel for providing the synchronizing information. In these systems a synchronizing pulse is sent between each line of document copy signals and the receiver synchronizes itself with these synchronizing pulses. Examples of this type of system are shown in U.S. Pat. Nos. 2,512,647 and 2,593,450 issued to F. A. Hester. These systems have not been particularly successful, if they have been used at all, because of instabilities caused by transient response of the electrical mechanical systems used and/or the particular complexities of the systems.

SUMMARY OF INVENTION

The present invention provides a much simpler and more economical means for phasing and synchronizing remotely located apparatus with a higher degree of stability than has heretofore been available. This invention provides a system for synchronizing a periodically operable device with synchronizing electrical signals of a predetermined first frequency received from the remote source comprising a motor for driving the periodically operable device and means for generating electrical pulses at a frequency dependent upon the speed of the motor. Means are provided for driving the motor at variable speeds and adapted to drive the motor at a quiescent speed to produce generated pulses of a frequency slightly different (either above or below) from the frequency of the received synchronizing pulses when the device is not synchronized with the incoming pulses. If there is a pulse time coincidence between a generated pulse and a synchronizing pulse the speed of the motor is rapidly altered and then, during the periods between pulse time coincidence, caused to sweep through the speed at which generated pulses of said predetermined frequency are produced towards the quiescent speed.

Figure 3:
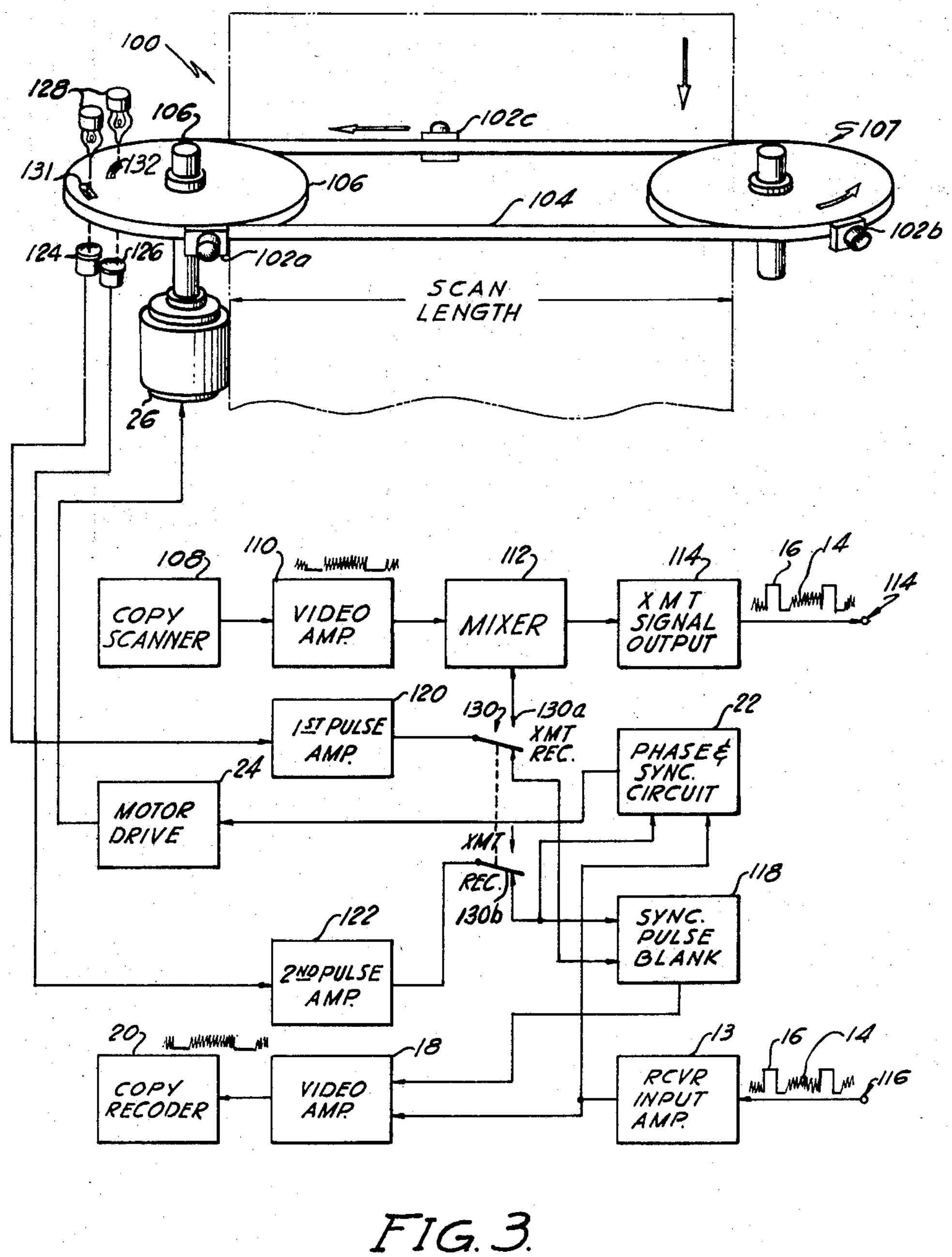

This invention will be better understood upon reading the remaining specification, especially when taken in view of the accompanying drawings in which:

FIG. 1 is a diagram, partially in schematic and partially in block form, of a facsimile receiver employing a phasing and synchronizing circuit embodying the present invention;

FIG. *1a* is a block diagram of a slight modification to the circuit of FIG. 1 if a DC motor system is desired;

FIGS. *2a* through *2–1* are diagrams of electric signal waveforms taken at different locations in the circuit; and FIG. 3 is a schematic representation of the phasing and synchronizing pulse generators for use in a facsimile transceiver.

The facsimile receiver 10 shown in FIG. 1 is adapted to receive at its input terminal 12 a facsimile signal such as shown in FIG. *2a*. The signal comprises a video portion 14 which is the picture data containing portion and a synchronizing and blanking pulse portion 15. The synchronizing pulse 16 is utilized to lock the operation of the receiver with the transmitter in a manner to be hereinafter explained. The pulse 16 is also used for automatic gain control purposes in a well known manner which will not be further explained. The video and sync pulse signal is amplified by amplifier 13 and the video portion 14 is handled by the recording amplifier 18 to provide the marking signals at the facsimile recorder 20. The synchronizing pulse 16 is utilized by the phasing and synchronizing circuit 22 to bring the receiver into synchronization with the transmitter. The circuit 22 operates as a control for a direct-current-operable, variable-frequency oscillator and motor drive circuit 24 which varies the speed of the motor 26 in accordance with the level of the DC signal applied thereto. The circuit 24 may comprise any type of oscillator which can be frequency controlled by means of a variable DC signal input. The motor 26, in addition to driving the recorder mechanism 20, also operates a pulse generator 28 for developing local pulses to be synchronized with the incoming synchronizing pulses 16. The pulse generator may comprise opaque disc 30 rotated by motor 26 and having an opening 32 through which light rays from source 34 periodically pass. The light pulses fall on photocell 36 at a frequency determined by the speed of the motor 26. The photocell 36 is connected to the input of the normally conducting transistor 38 so as to cause the transistor to cut off each time the photocell 36 is energized. The signal at the collector of transistor 38 is applied to an And gate 43 forming the input of the synchronizing and phasing circuit 22. The generated local pulse signal delivered to the gate 43 has the form shown in FIG. *2b*, with the pulses 46, 46' representing the local generated pulses.

The And gate 43 at the input to the circuit 22 comprises diodes 40 and 42 along with resistor 44. It receives at its other input the facsimile signal including the sync pulses 16 and serves to determine any pulse time overlap between the local pulses 46 and sync pulses 16.

The And gate 43 is connected along with capacitor 48 to the base 51 of NPN transistor 50. The collector 53 of transistor 50 is connected directly to a positive voltage source while the emitter 54 is connected to the base 56 of transistor 52 along with capacitor 58, capacitor 60, resistor 62 and resistor 64. The emitter 55 of transistor 52 is connected to ground through resistor 80 and capacitor 82 while the collector 66 is connected to a temperature compensated voltage source 76 through switch 90 and load resistor 70. The output signal $E_C$ is provided to the variable frequency oscillator and motor drive circuit 24 at a DC voltage level determined by the voltage divider 68 formed by resistors 70, 72 and potentiometer 74.

During quiescent operation and in the absence of a video signal 14 when there is no overlap of the local and synchronizing pulses at the input to And gate 43, the transistor 50 is nonconducting. Transistor 52 is therefore also nonconducting so that the voltage $E_C$ is at a predetermined voltage level which causes the circuit 24 to drive motor 26 at some predetermined speed. This level is selectable by the potentiometer 74 and is set so that the circuit 24 drives motor 26 at a speed at which the frequency of the generated local pulses is just slightly different from the frequency of the synchronizing pulses from the transmitter. In a system having component values shown in the table at the end of the specification the voltage $E_C$ is set so that the frequency of the variable frequency oscillator is approximately 61.5 cycles per second or slightly greater than the 60 cycles per second frequency of the energizing signal for the scanning motor in the facsimile transmitter. To drive the AC motor 26 at 60 cycles per second requires a control voltage $E_C$ to the variable frequency oscillator of approximately 5.2 volts.

The purpose of having the quiescent local pulse frequency set slightly different from the transmitted synchronizing pulse frequency is to enable a pulse catching function fundamental to the phasing and synchronizing techniques of this invention. This enables the receiver to automatically synchronize itself in proper phase relationship with the transmitter during the initial phasing period of a facsimile transmission, when the video signal 14 is temporarily blocked and only synchronizing pulses 16 are transmitted.

FIGS. 2*a*, 2*b* and 2*c* show the time sequence of the transitted and local sync pulses by which the local pulses seek the transmitted sync pulse and lock onto it. Since the period of the local signal pulses 46 during quiescent operation is less than the period of the transmitted synchronizing pulses 16 in the given example, the local sync pulses will have a leftward movement with respect to the stationary sync pulses 16 on the time diagrams of FIGS. 2*a* through 2*c*. Thus, while a local pulse 46 has a particular time relationship with respect to the sync pulse 16 at its first occurrence, the second local pulse 46' is closer to the next following sync pulse 16'. Likewise, the third following local signal pulse 46'' moves further to the left, and, as shown in FIG. 2*c*, actually has a period *t* of time coincidence with a transmitted synchronizing pulse 16. The width of the pulses 16 and 46 as well as the maximum frequency deviation between the transmitted sync signal pulses and the local signal pulses is governed by the requirement that the local pulse 46 should be caught as it passes a sync pulse 16. If the pulse frequency differential is too great or if the pulse widths are too small, it may be seen that in one cycle pulse 46 may be to the right of the sync pulse 16 and in the next cycle it may be to the left so that there is no pulse coincidence time *t*. The values shown and described herein have been calculated for systems utilizing AC power sources operating at 60 cycles per second. The period and pulse width times shown in FIG. 2*a* and 2*b* are indicative of a system in which the copy scanner and the transmitter operate at a speed of approximately 300 lines per minute driven by an AC synchronous motor energized from a 60 cps source.

The purpose of the phasing and syncing circuit 22 of course is to detect and maintain a pulse overlap time *t* between each local pulse and the respective sync pulse 16. A pulse overlap is detected by the And gate 43 which for that time period of overlap causes the capacitor 48 to begin charging towards positive 8 volts through resistor 44. The peak value to which capacitor 48 charges depends on the length of pulse overlap time *t* because the capacitor is discharged through the first one of diodes 40, 42 which loses the positive pulse at its cathode. The voltage across the capacitor 48 and hence at the base 51 of transistor 50 is therefore a series of positive going voltage spikes as shown in FIG. 2*d*. For a normal pulse overlap time *t* equal to about a third of a pulse width, the capacitor in the example circuit charges up to a peak of approximately 3.6 volts. The transistor 50, operating as an emitter follower, causes its emitter 54 to follow the voltage on the base 51 within approximately 0.2 volts. Thus, the capacitor 58 will charge to a peak voltage during each period of pulse time overlap, the level of which is determined by the peak voltage reached by capacitor 48. Between periods of pulse time overlap the capacitor 58 discharges through the circuit including resistor 62, capacitor 60, transistor 52 as well as the resistor 80 and capacitor 82 in the emitter circuit of transistor 52. In view of the high value of resistor 64, the high beta of transistor 52 and the high impedance of its emitter circuit, the circuit including resistor 62 and capacitors 58 and 60 determine the discharge rate of the capacitor 58. This discharge rate is selected to be substantially slower than the charge rate and to approximate the time between pulse overlaps so that the waveform at the base 56 of transistor 52 has the appearance shown in FIG. 2*e*. The signal is inverted at the collector 66 of transistor 52 so that the control voltage $E_C$ at the input of the variable frequency oscillator and motor drive 24 appears as shown in FIG.2*f*. The center voltage (marked 5.2 volts in this example) about which $E_C$ fluctuates is the control voltage required to operate the variable frequency oscillator and motor drive 24 at 60 cycles per second. The fluctuation in the voltage $E_C$, however, causes the oscillator to drop slightly below 60 cycles per second during the pulse time overlap *t* and slowly increase during the rest of the scanning period to a frequency slightly above 60 cycles per second as may be seen in the waveform of FIG. 2*g*. As long as the pulse overlap time *t* is greater than a predetermined minimum (about one-fourth to one-half of the pulse width of pulses 16 and 46) the frequency of the signal to the motor 26 will drop below the sync frequency during the time *t* and sweep across the sync frequency towards the quiescent frequency of 61.5 c.p.s. until the next occurrence of a pulse overlap. If, however, it is less than the minimum time *t* the control voltage $E_C$ will not drop below the 60 cycle voltage level (5.2 volts) and the local signal pulses 46 will continue to drift toward the left until the proper pulse overlap time is reached.

The resistor 62 and capacitor 60 act in conjunction with capacitor 58 to provide servo stabilization for preventing system oscillations. It acts as a phase shaping network to dampen any hunting. The capacitor 84 is connected across the output of the phasing and synchronizing circuit 22 to provide additional filtering for smoothing the control voltage $E_C$ to the variable frequency oscillator and motor drive 24. Capacitor 82 in the emitter circuit of transistor 52 improves the transient response of the circuit so as to enhance the pulse catching capability of the system.

It is to be understood that the circuit 22 can also act in the opposite mode to synchronize the local pulses 46 with the transmitted sync pulses 16. That is, the quiescent frequency of the local pulses may be lower than the sync frequency and the speed of the motor caused to increase momentarily during the period of pulse overlap and swept downwardly through the sync frequency motor speed between the periods of pulse overlap. This is illustrated in the waveforms shown in FIGS. 2*h* through 2–1. Since the local pulse quiescent frequency is less that the frequency of the sync pulses 16*a*, the local pulses 46', 46'' have the appearance of moving towards the right with respect to the transmitted sync pulses 16*a*. In this example the pulse catching is on the leading edges 86 of the sync pulses 16*a* as opposed to the lagging pulse edges 88 of the previously described transmitted signal of FIG. 2*a*. The manner in which the relationship between the sync pulses 16 and the video portion 14 of the transmitted signal is established will become apparent later with respect to the description of the generation of the various pulses and FIG. 3.

Figure 2:
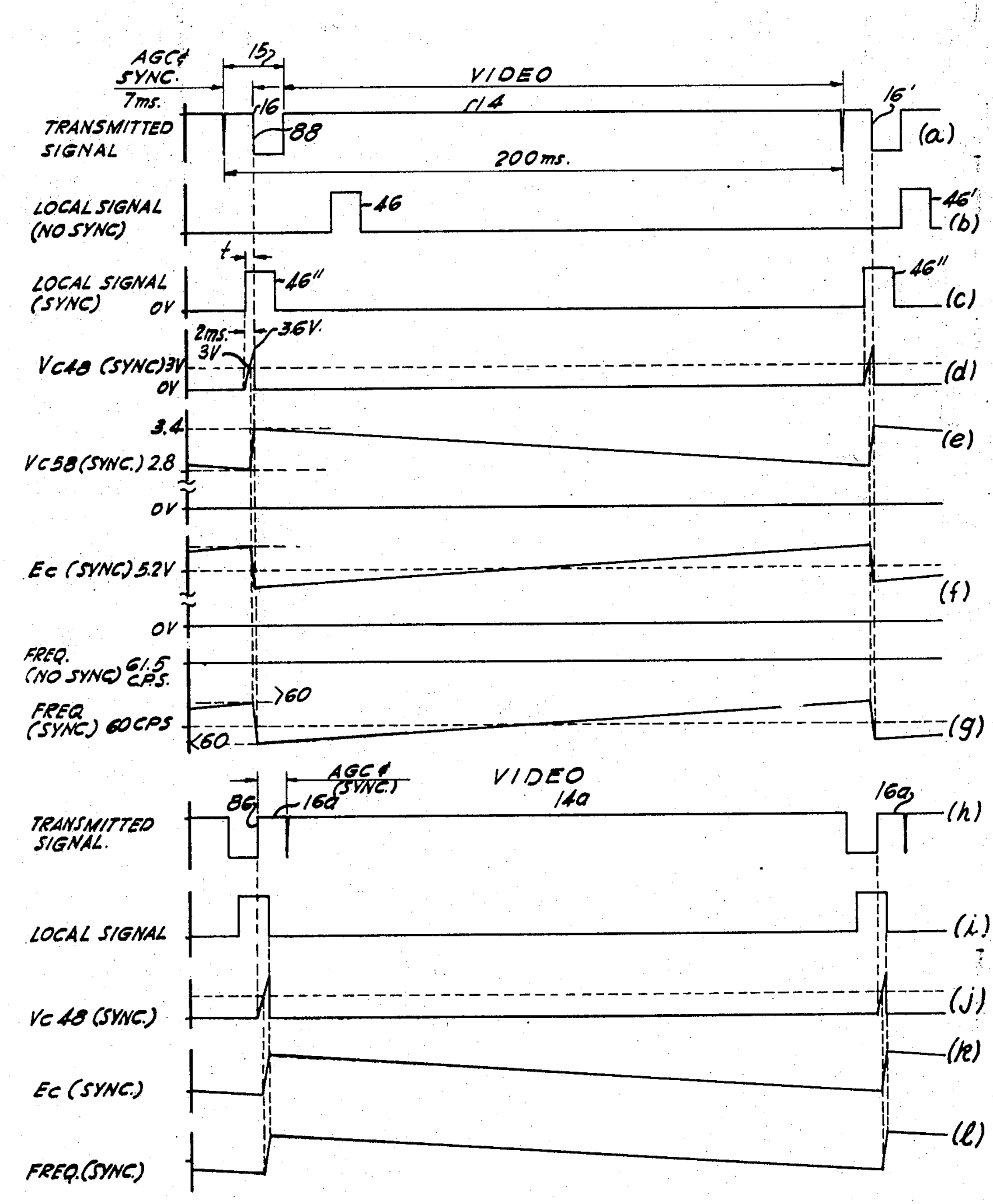

When the circuit is operating in the mode illustrated by the waveforms of FIGS. 2*h* through 2–1, the control voltage $E_C$ must have a reverse configuration from that in the previous example of FIGS. 2*a* through *g*. The double pole, double throw switch 90 provides for this signal reversal. Thus, when the switch 90 is thrown to its upper position the transistor 52 operates as an emitter follower so that the signal $E_C$ has the same phase configuration as the voltage at the base 56 of the transistor. The remainder of the circuit, of course, can remain essentially as previously described.

Figure 1A:
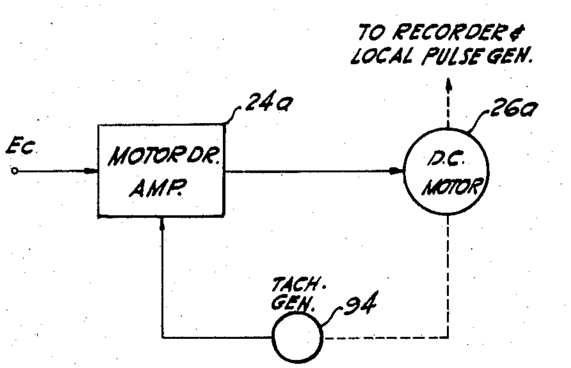

Since the control voltage $E_C$ at the output of the sync and phasing circuit 22 is a DC fluctuating signal, it is apparent that the AC sync motor 26 and the variable frequency oscillator and motor drive 24 can readily be replaced by a DC motor 26a (FIG. 1*a*) and a DC motor drive amplifier circuit 24a which would cause the speed of rotation of the motor to follow in accordance with the control voltage $E_C$. To provide a tight but responsive system it is preferable that a tachometer generator 94 be used to provide a feedback from the motor output to the motor drive amplifier 24a in a well known manner as shown in FIG. 1*a*.

FIG. 3 shows a facsimile transceiver adapted to the use of the phasing and synchronizing circuit 22 previously described. The transceiver is of the type shown and described in the application for U.S. Pat. Ser. No. 613,545, filed Feb. 2, 1967. Briefly, the transceiver comprises a scanning mechanism 100 which serves the dual purpose of scanning the document for transmission when the transceiver is used as a transmitter and serves as a paper marking device when the transceiver is used as a receiver. Three scanning heads 102a, *b* and *c* are equispaced around an endless belt 104. The belt 104 moves along the path defined by a drive pulley 106 and an idler pulley 107 so that as each scanning head passes the scan length it either develops electric signals for transmission or marks the recording medium. When used as a transmitter, copy scanners 108 in the form of photocells on the scanning heads 102a, *b*, *c* generate electric signals in accordance with the density of the copy being scanned which are introduced to a video amplifier 110, the output of which is combined in modulating circuit 112 with the syncing pulses in a manner to be described later. The combined sync pulse and video signal is then transmitted to an awaiting receiver.

When the transceiver is acting in the receiver mode the signal at the input terminal 116 is put through the input amplifier 13 and supplied to a video amplifier 18 which energizes the copy recorder 20, representing the marking means (not shown) in the scanning heads 102a, *b* and *c*. It is desirable to remove the sync pulses from the video signal going to the copy recorder so that no false markings are made on the recording medium due to the sync pulses. Therefore, a sync pulse blanking circuit 118 is provided to short out the video signal during the sync pulse portion of the scan.

The sync pulses for addition to the transmitted video signal as well as the sync pulse blanking for the receiver mode are provided by means of two pulse amplifiers 120, 122, each of which is driven by a separate photocell 124, 126. The photocells 124, 126 are each energized by light from a source 128 directed through respective openings 131, 132 in an opaque member forming a part of or rotating with pulley 106. The photocells 124, 126 and light slots or openings 131, 132 are so positioned that a pulse is first generated by photocell 124 and amplified by the first pulse amplifier 120 immediately followed by a second pulse from photocell 126 which is amplified by the second pulse amplifier 122. Since the scanning mechanism 100 always operates in the same counterclockwise direction whether the transceiver is operating in the transmit or the receive mode, the pulses from the amplifiers 120, 122 are always in the same time sequence with respect to each other. When the transceiver is in the transmit mode contacts 130a of double pole-double throw switch 130 provide the output pulse from the first pulse amplifier 120 to the mixer 112 where the first pulse is added to the video signal to provide the transmission signal as shown at the transmitter signal output 114. It will be seen that this is essentially the same type of signal sequence shown in FIG. 2*a* where the sync pulse 16 immediately follows the video portion 14 and a blank space appears between the lagging edge 88 of the sync pulse and the beginning of the video portion 14. As may be seen the output of the second pulse amplifier 122 is not used in this mode. However, if the signal of the type shown in FIG. 2*h* is to transmitted, the output from the second pulse amplifier 122 can be substituted for the first pulse amplifier 122 to be added to the video signal.

When the transceiver is in the receiving mode the local signal pulse 46 (FIG. 2*b*) which is to be compared with the received sync pulse 16 is generated by the second pulse amplifier 122 responsive to the periodic energization of photocell 126. The switch 130 being in its receive position conducts the output of the second pulse amplifier to the phase and sync circuit 22 via contacts 130b where it is compared for coincidence with the transmitted sync pulse 16 in the manner previously described. If, however, the system receives the transmitted waveforms of 2h the first pulse amplifier output would be used by the phase and sync circuit 22.

As previously mentioned, it is preferable to blank out or remove the synchronizing pulses from the video signal used to operate the recording means. Thus, in the receive mode the outputs of both pulse amplifiers 120, 122 are used by the sync pulse blanking circuit 118 to remove the sync pulse from the video signal in the video amplifier. The sync pulse blanking circuit 118 operates as an OR gate for the two signals and provides a ground to short out the video signal for their combined duration thus preventing any marking current in the copy recorder 20 during the syncing portion of the received signal.

| Resistors | Capacitors | Transistors |
|---|---|---|
| No. 35–68k | No. 48–47 mfd. | Nos. 38, 50, 66–40232. |
| No. 37–1k | No. 58–2.2 mfd. | |
| No. 44–10k | No. 60–100 mfd. | Diodes |
| No. 62–22k | No. 82–22 mfd. | Nos. 40, 42–1N461. |
| No. 64–1 meg. | No. 84–330 mfd. | |
| No. 70–1k | | Photocell |
| No. 72–1.2k | | No. 36–23L. |
| No. 74–5k | | |
| No. 80–5.6k | | |
| No. 92–5.6k | | |

While preferred embodiments of the invention have been described in detail herein, it is understood that modifications and additions may be made without materially deviating from the invention. Therefore, it is intended that the invention be limited only by the scope of the appending claims.

I claim:

1. A synchronizing system for synchronizing a periodically operable device with synchronizing electrical pulses of a predetermined first frequency comprising a motor for driving said device, means for generating electrical pulses at a frequency dependent on the speed of said motor, means for driving said motor at variable speeds, and means operable responsive to no time coincidence of said synchronizing and generated pulses for controlling said motor driving means to drive said motor at a quiescent speed at which said generated pulse frequency is slightly different than said predetermined frequency and operable responsive to a predetermined minimum of time coincidence of said synchronizing and generated pulses for controlling said motor driving means to sweep the speed of said motor through the speed at which generated pulses of said predetermined frequency are produced towards said quiescent speed between periods of said pulse time coincidence.

2. A synchronizing system for synchronizing a periodically operable device with synchronizing electrical pulses of a predetermined first frequency comprising a synchronous motor for driving said device, means for generating electrical pulses at a frequency dependent on the speed of said motor, a variable frequency oscillator for driving said motor, and means operable responsive to no time coincidence of said synchronizing and generated pulses for controlling said oscillator to drive said motor at a quiescent speed at which said generated pulse frequency is slightly different than said predetermined frequency and operable responsive to a predetermined minimum of time coincidence of said synchronizing and generated pulses for controlling said oscillator to sweep the speed of said motor through the speed at which generated pulses of said predetermined frequency are produced towards said quiescent speed between periods of said pulse time coincidence.

3. The synchronizing system of claim 1 wherein said motor driving means operates responsive to variations in a DC voltage level, and wherein said controlling means comprises means for developing a quiescent voltage level at its output with no pulse time coincidence, for changing its voltage level output during pulse time coincidence in the direction of a voltage level corresponding to said first frequency an amount determined by the amount of pulse time coincidence, and for sweeping said voltage level back toward said quiescent voltage level after each pulse coincidence.

4. The synchronizing system of claim 3 in which said controlling means comprises an And gate in receipt of said synchronizing and generated pulses to determine the amount of pulse time coincidence.

5. The synchronizing system of claim 3 wherein said voltage developing, changing and sweeping means comprises a first capacitor chargeable during pulse coincidence to a peak voltage level determined by the amount of pulse coincidence, means for discharging said capacitor after pulse coincidence rapidly with respect to the period of said synchronizing pulses, another capacitor, means for charging said other capacitor to a peak voltage determined by the peak voltage of said first capacitor during pulse coincidence, means including at least one resistor for discharging said other capacitor slowly with respect to the period of said synchronizing pulses, and means for providing the voltage level output of said controlling means in accordance with the voltage on said other capacitor.

6. The synchronizing system of claim 5 wherein said controlling means comprises in addition servo stabilization means to prevent large variations in said voltage level output.

7. The system of claim 1 wherein said pulse generating means comprises a mask having an opening therein operable in synchronism with said device and means including a light source and a photocell positioned to be actuated when said opening is aligned between said light source and photocell to produce said generated pulses.

8. In a facsimile system, a synchronizing system for synchronizing facsimile recording means with synchronizing electrical pulses transmitted between each line of transmitted copy at a predetermined first frequency comprising a motor for driving said recording means, means for generating electrical pulses at a frequency dependent on the speed of said motor, means for driving said motor at variable speeds, and means operable responsive to no time coincidence of said synchronizing and generated pulses for controlling said motor driving means to drive said motor at a quiescent speed at which said generated pulse frequency is slightly different than said predetermined frequency and operable responsive to a predetermined minimum of time coincidence of said synchronizing and generated pulses for controlling said motor driving means to sweep the speed of said motor through the speed at which generated pulses of said predetermined frequency are produced towards said quiescent speed between periods of said pulse time coincidence.

9. In a facsimile system receiver, a synchronizing system for synchronizing facsimile recording means with synchronizing electrical pulses transmitted between each line of transmitted copy at a predetermined first frequency comprising a synchronous motor for driving said recording means, means for generating electrical pulses at a frequency dependent on the speed of said motor, a variable frequency oscillator for driving said motor, and means operable responsive to no time coincidence of said synchronizing and generated pulses for controlling said oscillator to drive said motor at a quiescent speed at which said generated pulse frequency is slightly different than said predetermined frequency and operable responsive to a predetermined minimum of time coincidence of said synchronizing and generated pulses for controlling said oscillator to sweep the speed of said motor through the speed at which generated pulses of said predetermined frequency are produced towards said quiescent speed between periods of said pulse time coincidence.

10. The facsimile system of claim 8 wherein said motor driving means operates responsive to variations in a DC voltage level, and wherein said controlling means comprises means for developing a quiescent voltage level at its output with no pulse time coincidence, for changing its voltage level output during pulse time coincidence an amount determined by the amount of pulse time coincidence, and for sweeping said voltage level back toward said quiescent voltage level after each pulse coincidence.

11. The facsimile system of claim 10 in which said controlling means comprises an And gate in receipt of said synchronizing and generated pulses to determine the amount of pulse time coincidence.

12. The facsimile system of claim 11 wherein said voltage developing changing and sweeping means comprises a first capacitor chargeable during pulse coincidence to a peak voltage level determined by the amount of pulse coincidence, means for discharging said capacitor after pulse coincidence rapidly with respect to the period of said synchronizing pulses, means including at least one other capacitor for charging said other capacitor to a peak voltage determined by the peak voltage of said first capacitor during pulse coincidence, means including at least one resistor for discharging said other capacitor slowly with respect to the period of said synchronizing pulses, and means providing the voltage level output of said controlling means in accordance with the voltage on said other capacitor.

13. The facsimile system of claim 12 wherein said controlling means comprises in addition servo stabilization means to prevent large variations in said voltage level output.

14. The system of claim 8 wherein said pulse generating means comprises a mask having an opening therein operable in synchronism with said recording means, and means including a light source and a photocell positioned to be actuated when said opening is aligned between said light source and photocell to produce said generated pulses.

15. In combination with a combined facsimile transmitter and receiver device for selectively scanning a document periodically to produce and transmit video copy and synchronizing signals during a transmit mode and for receiving transmitted video copy and synchronizing signals to scan and reproduce on a marking medium a scanned document in synchronism with the transmitted signals during a receive mode, means for generating synchronizing and blanking pulses comprising a first pulse generator for generating a first pulse during a portion of each scan, a second pulse generator for generating a second pulse immediately after each first pulse, means for selectively applying the output of one of said pulse generators to said transmitted signal for producing said synchronizing signal when said device is in the transmitter mode, means for using the output of the other of said pulse generators for synchronizing the device with the received synchronizing signals when said device is in the receiver mode, and means for using the outputs of both signal generators to prevent marking of the medium during their existence when said device is in the receiver mode.

16. In the combination of claim 15 wherein said first pulse generator comprises a light source, circuit means including a photocell for developing a signal responsive to light, and a mask having an opening positionable between said light source and said photocell for a portion of each scan and wherein said second pulse generator comprises another light source, circuit means including a second photocell for developing a signal responsive to light and said mask having a second opening therein positionable between said light source and said photocell for a portion of each scan immediately following the generation of said first pulse.

17. A synchronizing system for synchronizing a periodically operable device with synchronizing electric pulses of a predetermined first frequency, comprising a motor for driving said device, means for generating electric pulses at a frequency dependent on the speed of said motor, means operable responsive to variations in a DC voltage level for driving said motor at a quiescent speed at which said generated pulse frequency is slightly different than said first frequency, a first capacitor, an And gate operable responsive to the time coincidence of said synchronizing and generated pulses for charging said first capacitor to a peak voltage dependent on the time length of the pulse coincidence, and for thereafter discharging said first capacitor rapidly with respect to the period of said synchronizing pulses, an emitter follower transistor circuit having said first capacitor across its input and a second capacitor across its output, said emitter follower circuit operable to charge said second capacitor to approximately the same voltage level peak as said first capacitor during pulse time coincidence, means including a transistor amplifier providing a slow discharge path for said second capacitor with respect to the period of said synchronizing pulses, and means at the output of said transistor amplifier providing the DC voltage for operating said motor driving means.

18. A synchronizing system for synchronizing a periodically operable device with synchronizing electrical pulses of a predetermined first frequency comprising means for operating said device, means for generating electrical pulses at a frequency dependent on the operating rate of said operating means, means for causing said operating means to operate at variable rates, means for controlling said causing means to cause said operating means to operate at a quiescent rate at which said generated pulse frequency is slightly different than said first frequency when there is no time coincidence of said synchronizing and generated pulses and operable responsive to a predetermined minimum of time coincidence of said synchronizing and generated pulses for controlling said causing means to sweep the rate of said operating means through the rate at which generated pulses of said predetermined frequency are produced towards said quiescent rate between periods of said pulse time coincidence.